United States Patent [19]

Walter et al.

[11] Patent Number: 4,781,654
[45] Date of Patent: Nov. 1, 1988

[54] RESILIENT SHAFT COUPLING

[75] Inventors: Jürgen Walter, Haltern; Manfred Lunke; Ulrich Falz, both of Dortmund, all of Fed. Rep. of Germany

[73] Assignee: Hackforth GmbH & Co. KG, Herne, Fed. Rep. of Germany

[21] Appl. No.: 943,648

[22] Filed: Dec. 17, 1986

[30] Foreign Application Priority Data

Dec. 19, 1985 [DE] Fed. Rep. of Germany ....... 3545027

[51] Int. Cl.$^4$ ................................................. F16D 3/77
[52] U.S. Cl. ...................................... 464/89; 464/162; 464/903
[58] Field of Search .................... 464/87, 89, 147, 150, 464/158, 162, 903

[56] References Cited

U.S. PATENT DOCUMENTS

| 1,978,940 | 10/1934 | Guy | 464/89 X |
| 3,678,708 | 7/1972 | Ernst et al. | 464/89 X |
| 4,385,893 | 5/1983 | Kirschey | 464/89 X |

FOREIGN PATENT DOCUMENTS

| 2255680 | 5/1974 | Fed. Rep. of Germany | 464/89 |
| 2706479 | 8/1978 | Fed. Rep. of Germany | 464/89 |
| 2834490 | 2/1980 | Fed. Rep. of Germany | 464/87 |
| 1557127 | 2/1969 | France | 464/89 |
| 705717 | 5/1941 | German Democratic Rep. | 464/87 |
| 941287 | 11/1963 | United Kingdom | 464/89 |

Primary Examiner—Daniel P. Stodola
Attorney, Agent, or Firm—Becker & Becker, Inc.

[57] ABSTRACT

A resilient shaft coupling that, to transmit torque, includes an annular intermediate member made of rubber disposed between an inner rigid coupling part and an outer rigid coupling part. The intermediate member has, on its outer periphery, pinion-like rubber teeth that mesh, with provision for axial movement, with companion inner teeth of the outer coupling part. The radially inner zone of the intermediate member is embodied as a member of uniform torsional strength. For radial support of the projecting portions of the outer zone, at least one closed metal ring is embedded in the rubber concentrically of the rotational axis near the radially inner interface of the zone and near each of the axial outer surfaces. The rings are preferably in the form of cables made from wire strands. To further increase the transmissible torque, the rubber of the outer zone is harder than the rubber of the inner zones. With this kind of arrangement of the metal rings, the endangered axially terminal annular zones are given effective radial support, so that in the axially central core zone of the intermediate member the rubber can still be urged outwardly by centrifugal force and, after overcoming the normal clearance, can press the teeth firmly into the inner teeth of the outer coupling part.

4 Claims, 2 Drawing Sheets

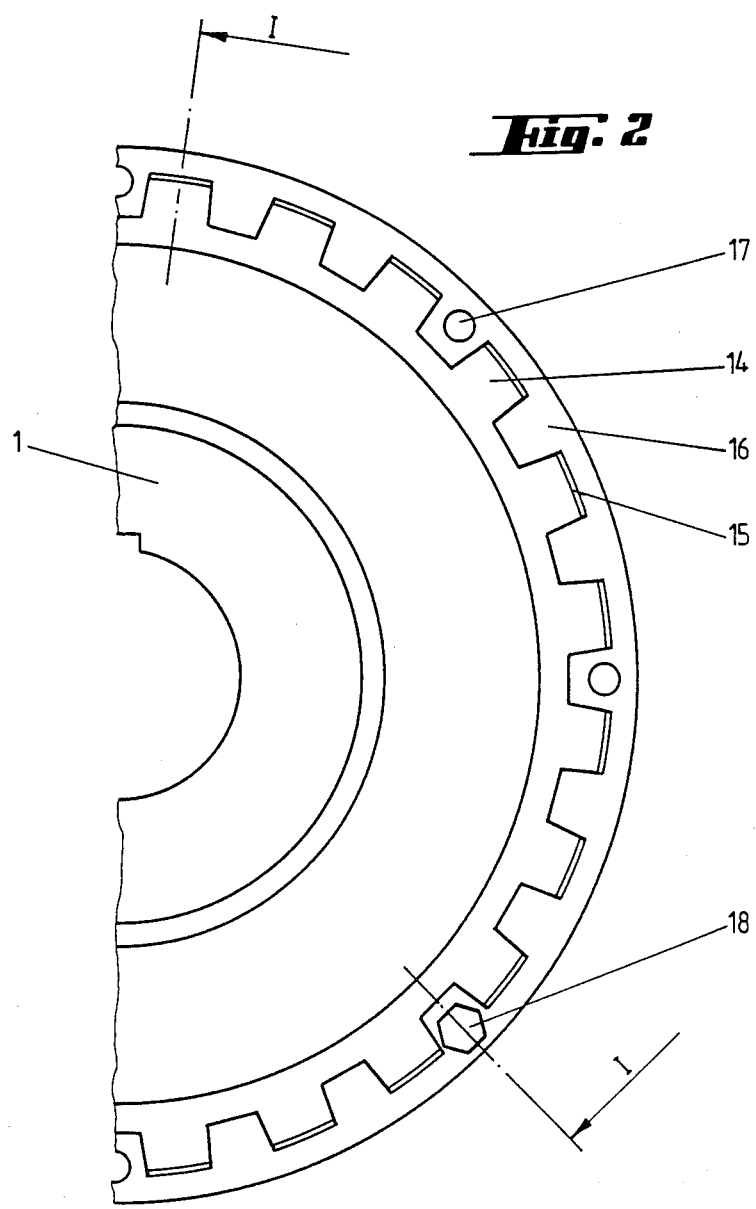

RESILIENT SHAFT COUPLING

BACKGROUND OF THE INVENTION

1. Field of the Invention

The present invention relates to a resilient shaft coupling having a radially inner rigid hub-like coupling part, an outer rigid coupling part, and a unitary, annular intermediate member that a is made of rubber or a similar material, and is operative to transmit torque between rigid parts. The intermediate member is secured to the inner part, for example by vulcanization. The outer periphery of the intermediate member is provided with pinion-like toothing that meshes, with provision for axial movement, with companion inner toothing of the outer part. The intermediate member comprises: a radially inner zone as a member of uniform torsional strength, i.e., it has an axial thickness that decreases radially outwardly; a short transition zone; and an outer zone which has the pinion-like toothing on its periphery, with the axial thickness of the outer zone corresponding approximately to the axial thickness of the inner zone on its inner periphery.

2. Description of the Prior Art

Resilient shaft couplings of this general type, also known as Bibby couplings, are primarily intended for use where the space available for installation is not accessible from the side. With the heretofore known resilient shaft couplings of this type, the intermediate member comprises a unitary annular rubber member. The torque which such a coupling can transmit is limited because, when a critical load is reached, the rubber toothing disengages from the inner toothing of the outer rigid coupling part. In operation, centrifugal force tends to partially oppose such disengagement by forcing the deformable rubber teeth outwardly into the inner toothing so that the clearances normally present are bridged.

To maximize the torque which a shaft coupling of this type can transmit, it has been conventional to make the resilient intermediate member of a relatively hard rubber. However, if a very high torsional resilience is required, the aforementioned approach is not practicable. The radial resilient length of the intermediate member cannot be increased because the external dimensions of the shaft coupling then also increase. When endeavors are made to achieve high torsional resilience by using a correspondingly soft rubber for a given performance and given dimensions, the risk of unreliable operation increases because the interval between the maximum transmissible torque and the average drive torque ceases to be sufficient.

To provide greater strength in the region of the toothing of the resilient intermediate member, a plain or profiled metal ring has been embedded in the rubber member near the toothing substantially over the entire axial length thereof. Consequently, when a plain ring is used the toothing can be strengthened radially; unfortunately, the advantageous effect of centrifugal force in operation of the coupling is eliminated. The use of a ring profiled to match the toothing leads to a substantially rigid toothing which in such a case basically consists of metal teeth having a thin covering of rubber. Also, because of their relatively substantial mass, the use of such metal rings, which extend substantially over the entire axial length of the rubber member, may produce additional stressing of the coupling in drives where vibration is likely to occur. Furthermore, wide rings are also relatively expensive.

An object of the present invention therefore is to further develop and improve a resilient shaft coupling of this kind in order to obviate the drawbacks previously set forth; i.e., the object of the invention is to provide a resilient shaft coupling which has relatively high torsional resilience yet can reliably transmit higher torques than can known shaft couplings of substantially the same size.

BRIEF DESCRIPTION OF THE DRAWINGS

This object, and other objects and advantages of the present invention, will appear more clearly from the following specification in conjunction with the accompanying schematic drawings, in which:

FIG. 2 is a partial view looking in the axial direction of the shaft coupling of FIG. 1.

SUMMARY OF THE INVENTION

Figure 1:
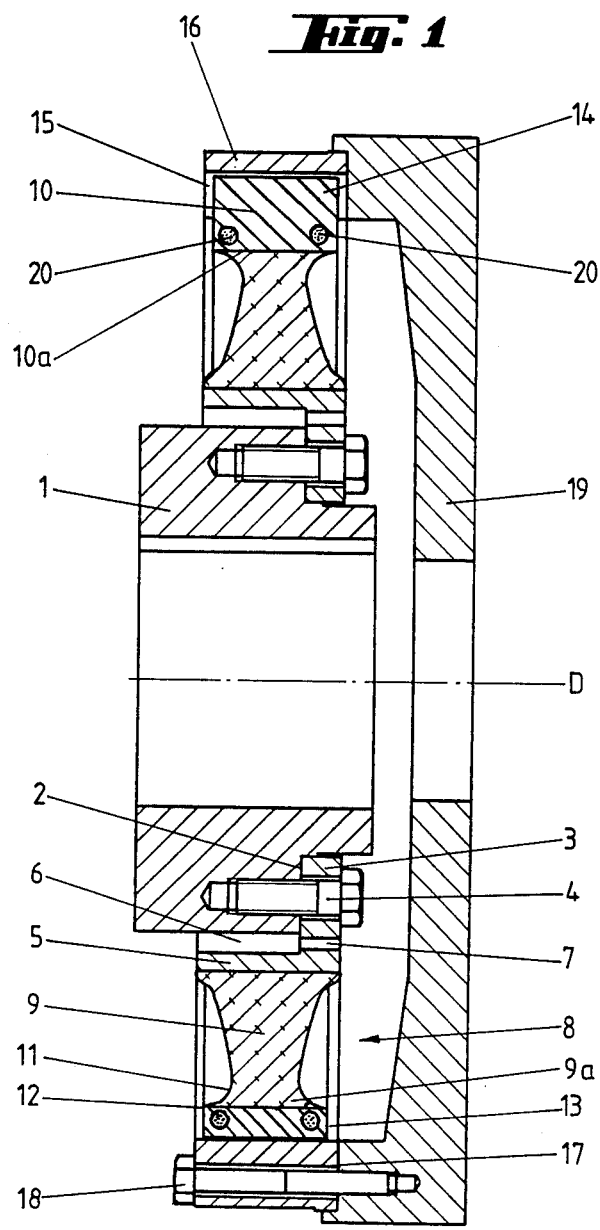
FIG. 1 is an axial cross-sectional view, as taken in the plane of the lines I—I of FIG. 2, of one exemplary embodiment of a resilient shaft coupling according to the invention.

According to the invention, starting from a resilient shaft coupling of the aforementioned general type, the outer zone is provided with closed metal rings, preferably of round cross-section, in the vicinity of the radially inner interface between the outer zone and the transition zone, with at least one metal ring being disposed near each axial outer surface of the outer zone, the metal rings being embedded in the rubber concentrically of the rotational axis.

In contrast to the known constructions, therefore, the invention provides a strengthening of the outer zone of the intermediate member only in those axially terminal annular zones which are particularly at risk; in particular, on each side, radial support of those portions of the outer zone which project relative to the axially constricted inner zone is provided by at least one closed metal ring of relatively low mass, so that bending-back of such portions during transmission of high torques is obviated. Since the central zone remains free, i.e., is unaffected by the actions of the metal rings, the axially inner main body of the intermediate member is free to expand radially due to centrifugal force when the coupling is in operation, so that the rubber teeth, after overcoming the conventional clearance, engage more tightly in the grooves of the toothing of the outer rigid coupling part.

Advantageously, the resilient intermediate member is a binary or two-component member; i.e., the outer zone is made of a rubber which is harder than the rubber used in the inner zones. The outer zone, which has the outer toothing, therefore has an increased bending resistance, which helps to significantly increase the transmissible torque without appreciable impairment of torsional resilience, the latter, practically speaking, being determined by the inner zone, where the rubber is softer than the outer zone. In this construction also, at least one closed metal ring is embedded in the rubber in each of the axially projecting annular regions of the outer zone. In the same way as in the construction of the intermediate member as a homogeneous rubber member, these metal rings provide radial support for these particularly endangered regions.

According to another advantageous feature of the present invention, the metal rings may be made of wire strands twisted together in the form of a cable. The junctions or butt joints of the individual strands are distributed substantially equidistantly around the periphery. Cables of this type can be mechanically produced simply and at low cost in a conventional manner. Because of the large number of individual strands, there is far less risk of a failure due to breaking than in the case of a solid ring. Another advantage is that a stranded wire ring has a much larger surface area than does a solid ring with a smooth surface, and therefore presents a correspondingly larger area for engagement and adhesion to the rubber during vulcanization, the rubber also being able to penetrate into the fine gaps or voids between the individual strands. In all, metal rings of round cross-section have the advantage of a very reduced mass, so that even when vibratory stress of the drive is severe, excessive acceleration forces that are likely to loosen a metal ring in the rubber cannot occur.

Further specific features of the present invention will be described in detail subsequently.

DESCRIPTION OF PREFERRED EMBODIMENTS

Referring now to the drawings in detail, the illustrated resilient shaft coupling includes an inner rigid coupling part that is formed by a hub 1 which, on one end face, has a recessed portion that results in an annular surface 2 which extends transversely to the rotational axis D and to which a flanged ring 3 is detachably secured by threaded bolts 4. An axially extending support ring 5 is formed on the ring 3 and extends around the hub 1 in such a way as to form an annular gap 6. Communicating bores 7 disposed in the ring 3 with their axes parallel to one another connect the gap 6 to the other side of the ring 3 and thus enable a flow of cooling air to form.

An intermediate member 8, in the form of a unitary annular rubber member, is secured by vulcanization to the outer surface of the ring 5. This annular member, in the region of a radially inner zone 9, is formed as a member of uniform torsional strength. The inner zone 9 merges into a radially short transition zone 9a which in turn merges into an outer zone 10 with an axial thickness corresponding substantially to the axial thickness in the base region of the inner zone 9. The transition zone 9a is bounded by concave wall surfaces 11 that terminate at the inner edges 12 of the outer surfaces 13 of the outer zone 10. The outer periphery of the outer zone 10 is in the form of a spur gear or pinion, i.e, the outer zone at this location has a gear-tooth system with identical teeth 14.

The rubber teeth 14 engage in tooth spaces or grooves 15 in a companion inner toothing of an outer ring 16 that forms the outer rigid coupling part. The inner coupling part and the intermediate member 8 can be positively coupled with the outer ring 16 by a simple axial movement, and can be detached from one another by a corresponding movement in the opposite direction.

As FIG. 2 shows, the outer ring 16 is provided with through-holes 17 disposed in successive equidistant relationship in the peripheral direction. The holes 17 extend parallel to the rotational axis D, and are adapted to receive threaded bolts 18, the threaded ends of which are screwed into tapped bores of a motor flywheel 19. The bolts 18 serve for detachably securing the outer ring 16 to the flywheel 19.

With this kind of resilient intermediate member 8 there is a risk, when substantial torques are being transmitted, that those axial end parts of the outer zone 10 that project beyond the constricted inner zone 9 may bend back radially inwards, with the result that the teeth 14 disengage from the grooves 15 in the inner toothing of the outer ring 16. To obviate any such disengagement, a respective closed metal ring 20 of circular cross-section is embedded or vulcanized in the rubber, concentrically of the rotational axis D, in each of the projecting portions of the outer zone 10 near their radially inward cylindrical interface or boundary surface 10a. Advantageously, the rings 20 comprise wire strands twisted together in the form of a cable.

The rings 20 provide radial support for the axially projecting ring portions of the outer zone 10 and thus prevent these portions from bending back when the shaft coupling is dealing with heavy torque loads. As FIG. 1 shows, the rings 20 are spaced sufficiently far apart from one another axially so that the core zone of the resilient intermediate member 8 remains free, with the result that when the coupling is in operation, the rubber material is free to expand outwardly due to centrifugal force, so that in conformity therewith the rubber teeth 14 are pressed into the grooves 15 in the inner toothing of the outer ring 16.

A further appreciable increase in the amount of torque that can be transmitted can be achieved if the outer zone 10 of the resilient intermediate member 8 is made of a harder rubber than are the inner zone 9 and the transition zone 9a, i.e, if the member 8 is embodied as a binary or two-component member. A particular advantage in this connection is that there is no appreciable impairment of the torsional resilience of the shaft coupling, since such resilience is primarily determined by the properties of the softer rubber of the inner zone 9 of the member 8.

For a shaft coupling of a particular size, for example, the hardness of the rubber of the inner zone 9, including the transition zone 9a, can be about 45° Shore A, and the hardness of the outer zone 10 can be about 75° Shore A.

The intermediate member 8 is made of two different rubbers, with the outer zone 10 being made of a rubber that is harder than the rubber of the inner zone 9 and transition zone 9a.

Each of the metal rings 20 comprises wire strands that have been twisted together to form a cable.

Butt joints of the individual wire strands of a given metal ring 20 are distributed substantially equidistantly around the periphery of that ring.

The present invention is, of course, in no way restricted to the specific disclosure of the specification and drawings, but also encompasses any modifications within the scope of the appended claims.

What we claim is:

1. In a resilient shaft coupling having radially inner rigid hub-like coupling part, an outer rigid coupling part, and a unitary, annular intermediate member that is made of an elastomeric material and is operative to transmit torque between said rigid parts, with said intermediate member being secured to said inner coupling part by vulcanization, and with the radially outer periphery of said intermediate member being provided with pinion-like first toothing means for meshing engagement, with provision for axial movement relative to a companion inner second toothing means also for meshing engagement of said outer coupling part during a positive connection effected by meshing engagement of said first and second toothing means, whereby said intermediate member comprises: a radially inner zone as a member of uniform torsional strength, said zone having an axial thickness that decreases radially outwardly; a short transition zone; and an outer zone which has said pinion-like first toothing means for meshing engagement on its radially outer periphery, with a radially inner interface being provided between said outer zone and said transition zone, the improvement in combination therewith which comprises:

closed metal rings embedded as provided in axially projecting annular regions of said outer zone of said intermediate member located near said radially inner interface between said outer zone and said transition zone, with at least one of said closed metal rings being disposed near each of the two axially outer surfaces of said outer zone, said metal rings being embedded in the material of said outer zone in a manner disposed concentric to the rotational axis of said coupling so that said metal rings serve to attain a radial support of the axially projecting annular regions via radially directed support forces to protect against bending and premature destruction of the annular regions of said intermediate member especially endangered relative to said radially inner zone during loading of the shaft coupling as well as to resist radial-pressure tensioning forces taken up by said closed metal rings in the shaft coupling to provide a resilient shaft coupling having a relatively high torsional resilience yet able reliably to transmit higher torques than comparable shaft couplings of substantially the same size.

2. A coupling in combination according to claim 1, in which each of said metal rings has an essentially round cross-sectional shape.

3. A coupling in combination according to claim 1, in which said intermediate member is made of two different rubbers, with said outer zone being made of a rubber that is harder than the rubber of said inner and transition zones.

4. A coupling in combination according to claim 1, in which each of said metal rings comprises wire strands that have been twisted together to form a cable of embedded strands.

* * * * *